Feb. 13, 1968  A. A. LACHANCE ET AL  3,368,646
REMOVING CARTS FROM CHECKOUT COUNTERS
Filed Sept. 23, 1966  4 Sheets-Sheet 1
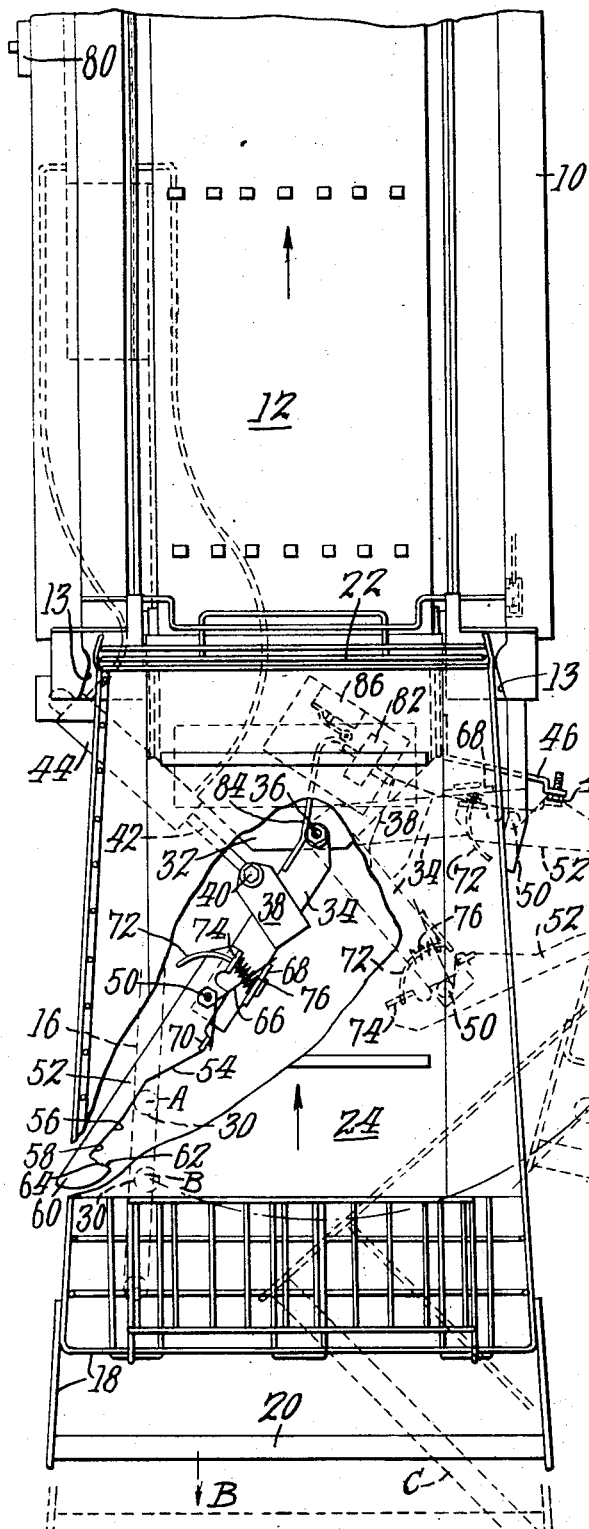
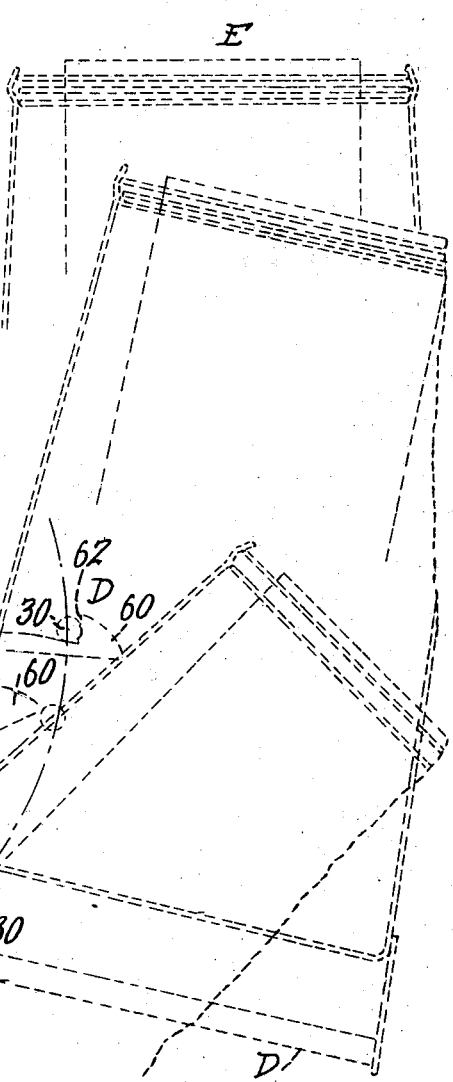
Fig. 1
Inventors
Armand A. Lachance
Thomas T. Brunelle
Harlan W. Hilton
By Attorney

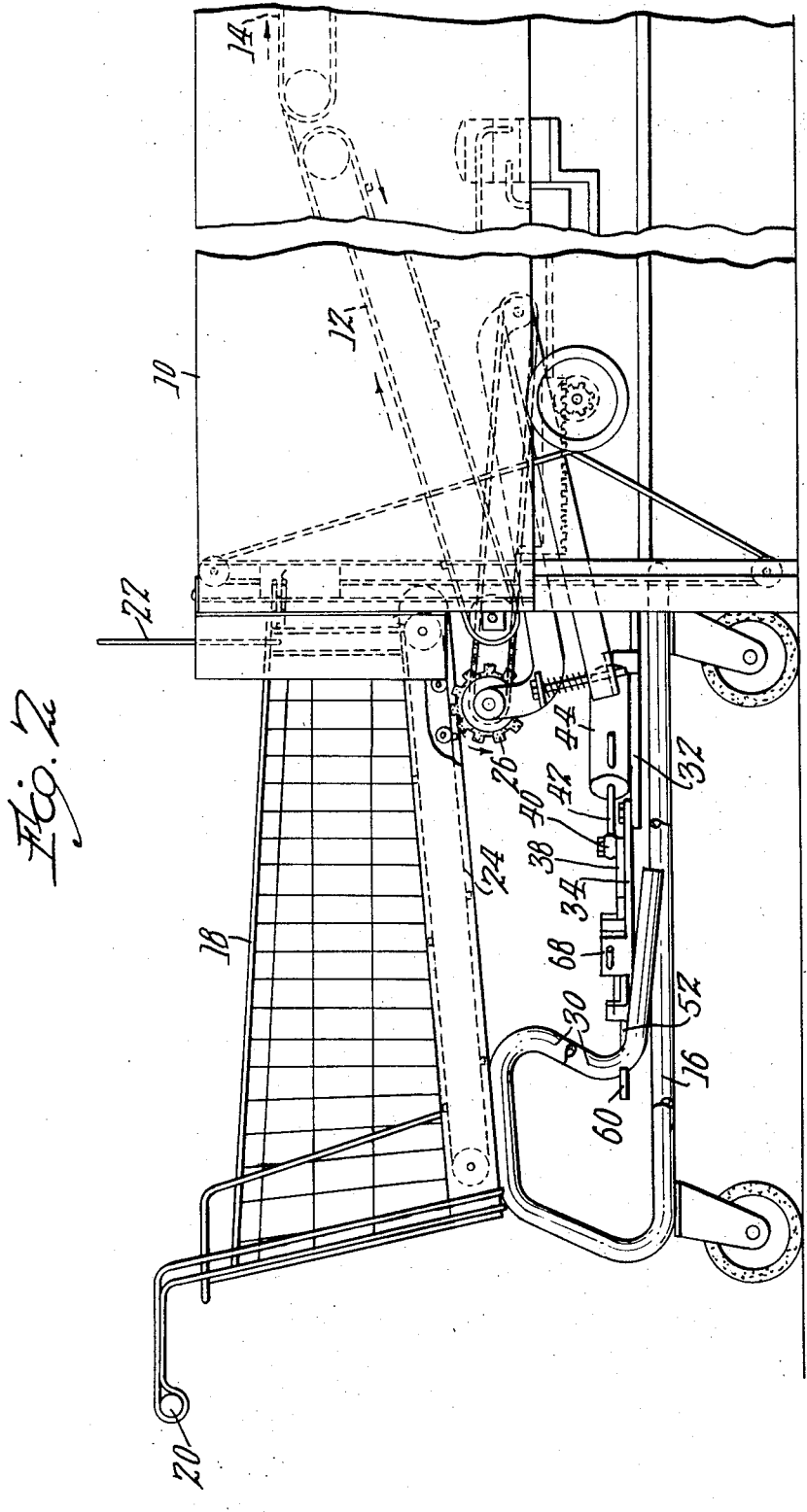

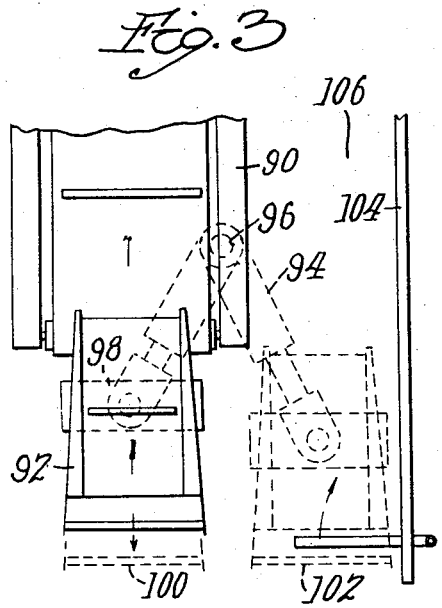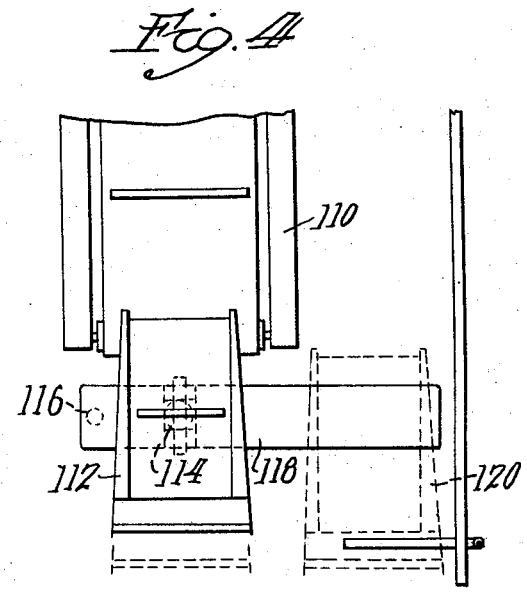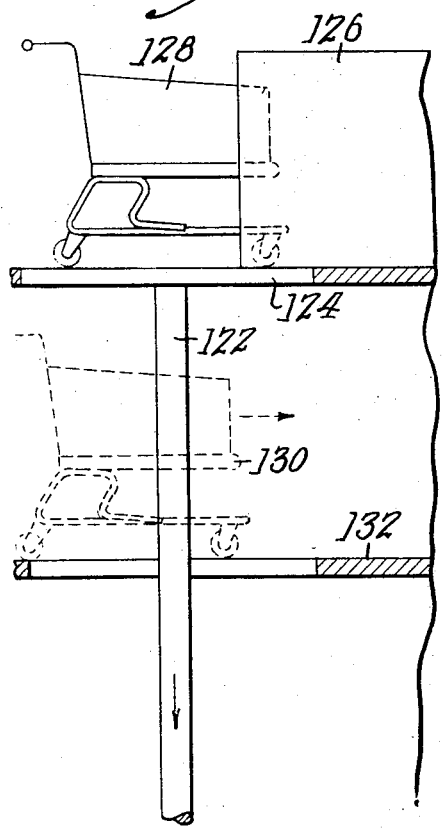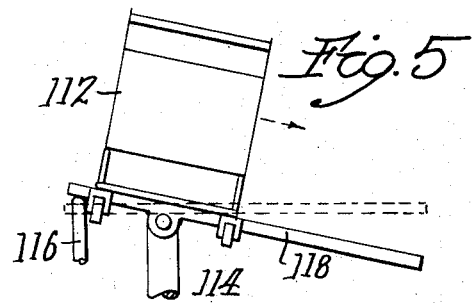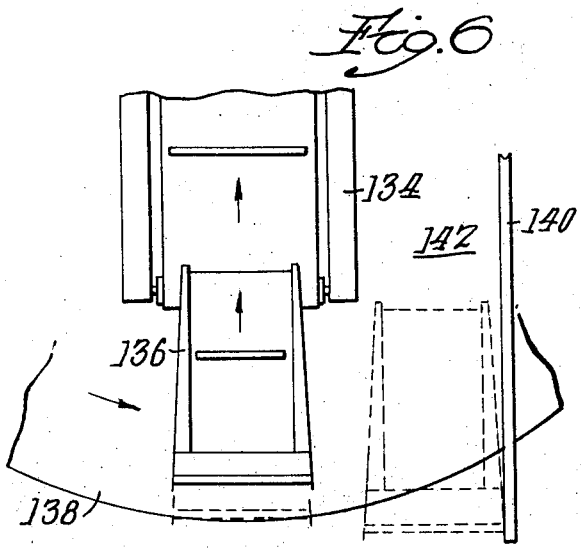

United States Patent Office 3,368,646
Patented Feb. 13, 1968

3,368,646
REMOVING CARTS FROM CHECKOUT
COUNTERS
Armand A. Lachance, Auburn, Harlan W. Hilton, Dudley, and Thomas T. Brunelle, Brookfield, Mass., assignors to Armand A. Lachance, Auburn, Mass.
Filed Sept. 23, 1966, Ser. No. 581,528
9 Claims. (Cl. 186—1)

ABSTRACT OF THE DISCLOSURE

A checkout stand for use in a store in combination with a grocery cart, wherein the checkout stand has an unloading station for the cart and has a cashier's station in advance thereof, the cart being automatically unloaded and including means under control of the operator for mechanically moving the cart away from the unloading station when it is empty to a clear space in front of the cashier, this clear space including a relatively narrow alley so that a customer standing in the alley adjacent the cashier, after having positioned the cart at the unloading station, is in a position to easily push the empty cart of the previous customer along the alley to a point where the carts are collected as usual.

---

This invention relates to a new and improved apparatus for automatically providing for removal of a cart from a position relative to a checkout counter where the goods are removed from the cart and transferred to the checkout counter. In the prior art, these carts have to be moved by the customer.

This invention relates particularly to automatically unloading carts where the cart is brought up to a certain predetermined position with relation to the checkout counter and is held in position there until the contents are extracted therefrom as by conveyors and moved into the checkout area where they are checked out by the cashier. In this kind of operation, the customer usually leaves the cart and moves to the position of the cashier because she wishes to check on the amounts rung up and also to check on the goods as they pass through the cashier's hands. This being the case, this leaves the cart in the unloading location which is in the way of the next subsequent customer. It is therefore an object of the present invention to move the cart out of the predetermined unloading location and into a narrow alleyway alongside the checkout stand, where it will be pushed along to an exit by the subsequent customer or by some other means.

Reference is made to my copending patent applications Ser. No. 478,860, filed Aug. 11, 1965, and Ser. No. 496,590, filed Oct. 15, 1965, which disclose means for locating the cart in unloading position and emptying automatically it so that the customer need not lift the merchandise out of that cart onto the counter.

Other objects and advantages of the invention will appear hereinafter.

Reference is to be had to the accompanying drawings in which:

FIG. 1 is a plan view showing the mechanism of the present invention;

FIG. 2 is a view in side elevation thereof; and

Figure 8:
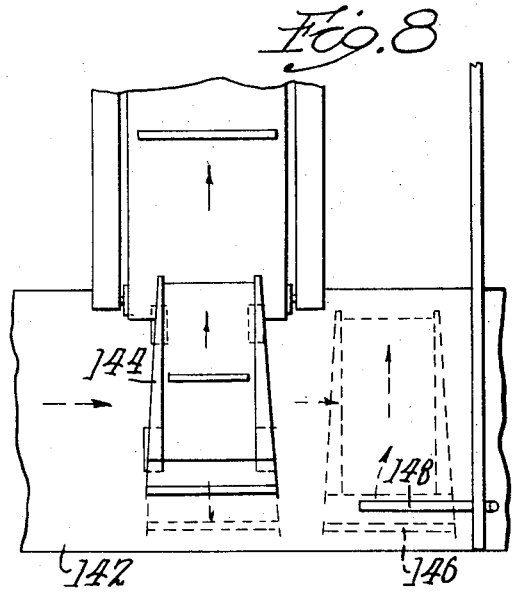

FIGS. 3 to 11 inclusive are diagrammatic views illustrating broadly different ways in which the cart can be moved from the unloading station to the side of the checkout stand in position to be moved past it.

Referring first to FIG. 2 the checkout counter in general is indicated by the reference numeral 10. As shown in some of my copending patent applications, this checkout counter is provided with an inclined conveyor or the like at 12 which leads the merchandise up the incline in the direction of the arrows to a point for instance at 14 which may be taken as a checkout area although another conveyor may also be used to carry the goods past the cashier. On both sides of the counter 10 are guides attached thereto having inwardly slanting surfaces 13 to help the customer to guide the basket into the proper unloading position at the checkout counter.

The cart itself is more or less of standard construction having an underframe 16, the usual wheels etc., a nesting basket 18, a pusher handle 20 and the usual swinging rear wall for nesting purposes. This cart has a gate as for instance best illustrated at 22 which is opened to allow the goods to exit therethrough onto conveyor 12 and it is also provided with a bottom which comprises an endless belt conveyor 24 adapted to be driven by a power roll 26. The power roll 26 is movable generally vertically from an inoperative lower position to an operative upper position where it energizes the belt to drive it in a direction to discharge the contents of the basket through the open gate in the front of the basket onto belt 12.

It will be seen that the cart is located at a predetermined unloading position as respects the checkout counter and that with the operation of the merchandise proceeding smoothly from the cart onto the conveyor and up to the position of the cashier, the customer will naturally leave the positon behind the pusher handle 20 to move up to where the cashier is to watch the cash register and her goods. This leaves the cart in the location shown in FIG. 2 and it is desirable to move it from this position away from the checkout counter into the dotted line positions illustrated in FIG. 1. This is in a kind of a narrow alley so that it will be seen that any cart in this position, not only is empty but it has to be pushed forwardly in order to reach the position where it can exit from the alley. This is simple and easy to accomplish because the cart is empty and all the subsequent customer has to do is to move up to the cashier position, push the previous customer's cart forwardly to a point where it is out of the way or in line to be realigned and nested for subsequent operations by an employee, etc.

The power operated devices for unloading the cart and also for moving the cart from solid to dotted line positions in FIG. 1 are under the control of the operator or cashier so that there will be no accidents involved and none of the mechanism can operate prematurely as would be possible were any of the controls dependent upon the position of the cart, etc.

The cart itself is provided with legs or other uprights as for instance at 30. These legs support the basket in elevated position on the frame 16. In the embodiment of the invention which is shown in FIGS. 1 and 2, there is provided means which contacts one of these legs 30, and sweeps the cart to the right in FIG. 1, moving it counterclockwise in a kind of J-shaped motion from the solid line position through the various dotted line positions. It is emphasized that many different mechanisms can be used for this purpose as will be explained hereinafter but the present disclosure is utilized for showing in detail one particular example of mechanism, which embodies means for engaging e.g. one of the legs 30 or some other leg or projection of the cart or of the basket.

A stationary support is mounted horizontally as indicated at 32, this support being conveniently mounted on the forward end portion of the checkout stand. It supports a horizontally swingable arm 34 pivoted at 36 on support 32, and on which is fixedly mounted a block 38 having a pivot connection 40 with respect to an arm 42 forming a plunger for a ram or air cylinder 44. Thus under influence of the ram 44, the arm 34 is movable in an arc about its pivot point 36 as for instance in a counterclockwise direction from its solid line position in FIG. 1 to the extreme dotted line position as shown where it comes to rest against the stop 46. Stop 46 is mounted in fixed relation but it may have an adjustable abutment 48 so that the final position of the arm 34 can be closely controlled.

Pivotally mounted at 50 on the outer free end of arm 34 there is a hook arm 52 having an inwardly directed cam surface 54, another surface 56 of more or less elongated form which tapers slightly at 58 terminating in a hook 60 having a face 62 in which is a slight pocket 64.

The hook arm 52 is held yieldingly in the solid line position shown in FIG. 1 by a torsion spring 66 which may be a straight spring wrapped around the bolt or pin at 50 and bearing on an abutment 68 on arm 34 and on another abutment 70 on the arm 52. There is also an arcuate guide member 72 mounted on abutment 68, or other place on arm 34, passing through a bracket or the like 74 on the arm 52 and having a spring 76 located therebetween constantly urging the arm in a direction opposite to that of the spring 54 and forming as a matter of fact a bumper or dashpot for the motion of the arm in a clockwise direction about the pivot pin 50. All of this apparatus may be substantially enclosed in a concealing and protective housing not shown but the hook 60 and its face 62, etc. extends outwardly into position where it can be of use.

All of the parts thus described are in their normal position in solid lines in FIG. 1. The cart has to be positioned as in solid lines in FIG. 1 in order to deposit the goods therefrom onto conveyor 12. However the cart is arranged in this position merely by pushing it straight ahead and when this happens the leg 30 in position A strikes against the edge 56 or 54. The position A of leg 30 shows the parts in the position of the cart as in FIG. 2 where it is in a predetermined unloading location and it is operative for moving the merchandise onto belt 12. When the cart is empty the operator pushes a switch such as at 80 for instance to energize mechanism to cause the ram 44 or air cylinder to operate. This causes the entire arm 34 and 52 to swing in a counterclockwise direction. It will be seen that immediately the cart is moved slightly to the rear, position B, and then the forward portion of the cart will be swung slightly to the right in FIG. 1. Due to the contour of the edges 54, 56 and 58, this motion will continue throughout a considerable arc to the 45° position of the cart which is the first dotted line position shown.

At approximately the 45° location or slightly thereafter, the leg 30 will relatively slide to the end of the surface at 58 into the pocket 64 of the hook face 62. Arms 34 and 52 continue in this motion until block 38 contacts a reversing switch 82 at which point arm 34 stops as shown in dotted line position D in FIG. 1, and the cart continues (by inertia) to the E position out in the alley in front of the checkstand 10.

After the reversing switch is actuated, arm 34 starts in a rearward direction and disengages from the leg or strut 30. It returns now in a clockwise direction to the solid line position but can break at the pivot 50 as is illustrated so that if it should happen to strike anything it breaks as shown without doing any damage, but when it gets back to the solid line position, the torsion spring will once more straighten it out. A member 84 attached to arm 34 engages a stop switch 86 and also the reverse switch 82 so that it will allow the arm 34 to move clockwise when the operator starts switch 80.

Referring now to FIGS. 3 to 11 inclusive, there are here shown diagrammatically various other ways in which the cart might be moved from one position to another to carry out the objects of the invention as explained above. The different ways which are shown in these views are not limiting and other ways also might be utilized in order to accomplish the desired motion of the cart.

FIG. 3, where the checkout stand is indicated at 90 and the cart at 92, a power cylinder or the like indicated at 94 may be mounted as for instance on a pivot 96. It engages some portion of the cart as shown at 98, and is used to back it off as is indicated in dotted lines at 100, and then swinging about in a counterclockwise direction positions the cart at the location 102. The reference numeral 104 indicates another checkout stand or the railing so as to form the alleyway at 106. The customer's utilization of the device however is the same as above explained.

In FIGS. 4 and 5 the checkout stand is indicated at 110 and the cart at 112. In this case a lift is used, the lift being shown generally at 114, see FIG. 9, and another power operated member 116 is utilized to tilt the platform 118 that actually engages the under side of the cart, lifts it, and tilts it so that it slides down to the location 120.

In FIG. 7 there is shown a lift at 122 having a platform 124. The checkout stand is at 126 and the cart at 128. In this case the cart is merely made to descend (or raised) to the position at 130 where it can then be pushed by a conveyor or an employee along a sub-floor or tunnel 132. Any convenient backoff means such as a power cylinder can of course be used in this case as well as in the other cases.

In FIG. 6 the checkout counter is shown at 134 and the cart at 136. A large rotating platform 138 is provided and this merely turns the cart into a railing or wall at 140 so that it faces the alleyway 142 as desired.

In FIG. 8 there is shown a moving floor 142 which can be utilized to move intermittently under the control of the operator in order to position the carts as between for instance the 144 position and the position shown at 146. Also a pusher element 148 may be utilized if desired.

Figure 9:
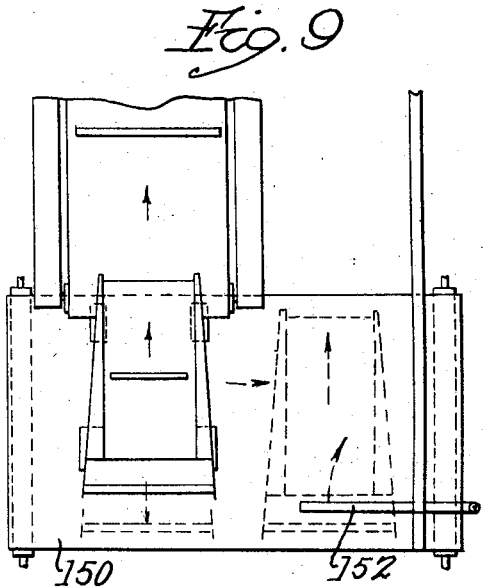

In FIG. 9 there is a similar arrangement but in this case there is a short belt 150 instead of a complete floor, and a pivoted or the like pusher element 152 under control of the operator if this should be thought to be desirable.

Figure 10:
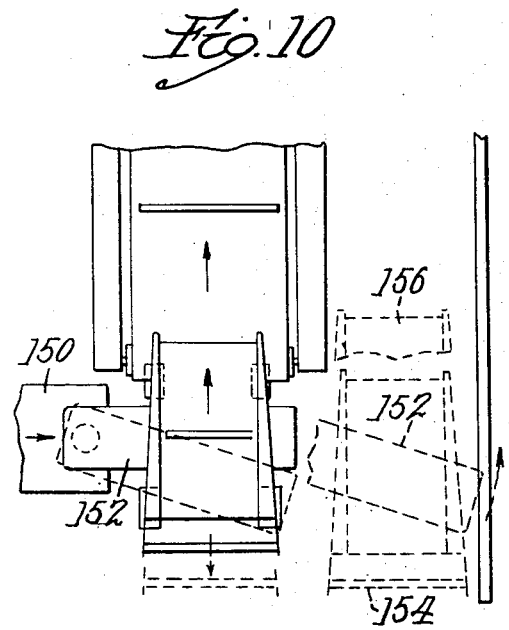

In FIG. 10 a laterally operating power operated member 150 with a power operated pivoted member 152 can be utilized to come up under the cart, swing it to an angular position, and move it to the dotted line position indicated at 154, whereupon the arm 152 would move forwardly to move the cart forwardly as indicated at 156.

Figure 11:
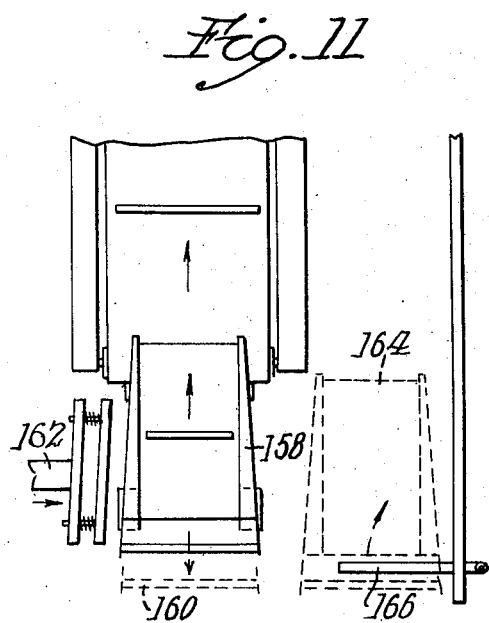

In FIG. 11 any backout type of device might be utilized such as the ram or the like to move the cart from the position at 158 to the position at 160 and then another ram 162 merely moves laterally to move the cart to the dotted line position 164. Here again the pusher member at 166 could be utilized to move the cart forwardly.

Having thus described our invention and the advantages thereof, we do not wish to be limited to the details herein disclosed, otherwise than as set forth in the claims, but what we claim is:

1. The combination with a checkout stand having an unloading station and a cashier's station spaced therefrom, the stand receiving articles from a cart at said unloading station, the customer having previously selected the articles and placed them in the cart and pushed the cart to the unloading station, the latter being in advance of the cashier's station, said checkout stand also having a clear space along the side thereof which extends from said station past the cashier's station to a point adjacent the end of the stand where the cart may be collected for reuse, of movable means, located generally in an out-of-the-way position at said unloading station, and power means to actuate the movable means to move the cart without manual assistance from the unloading station to a position in the clear space, and to return the movable means to its original position, said movable means including a swingable element, means on said element to engage and at least partially hold a portion of said cart, said power means moving said swingable element in a direction to move said cart relative to the checkstand so as to clear the same.

2. The combination of claim 1 wherein said swingable element is pivoted and swings in a generally horizontal plane.

3. The combination of claim 1 wherein said element is in the form of a lever having a joint intermediate the ends thereof, the means to at least partially grasp the cart being at the extreme end of said lever so that the lever can break intermediate its ends in one direction of motion thereof.

4. The combination of claim 1 wherein said element is in the form of a lever having a joint intermediate the ends thereof, the means to at least partially grasp the cart being at the extreme end of said lever so that the lever can break intermediate its ends in one direction of motion thereof, and means holding said joint yieldably so that the entire lever is normally substantially straight.

5. The combination of claim 1 wherein said element is in the form of a lever having a joint intermediate the ends thereof, the means to at least partially grasp the cart being at the extreme end of said lever so that the lever can break intermediate its ends in one direction of motion thereof, and spring means tending to maintain the lever in its straight condition.

6. The combination of claim 1 wherein said element is in the form of a lever having a joint intermediate the ends thereof, the means to at least partially grasp the cart being at the extreme end of said lever so that the lever can break intermediate its ends in one direction of motion thereof, and a stop on said lever limiting the motion of the break of the lever.

7. The combination of claim 1 wherein said swingable element comprising a free-end lever comprising two members interpivoted with respect to each other and swingable in a general horizontal plane, one of said members being pivoted at a fixed location with respect to said checkstand, said power means moving the same in an arc, a hook-like recess adjacent the free end of said lever, said cart including means for reception in said hook so that the lever is engaged with the cart as the lever swings to move the cart to the checkstand clear position.

8. The combination of claim 1 wherein said element is a lever.

9. The combination of claim 1 wherein said element is a lever having a joint intermediate the ends thereof.

References Cited

UNITED STATES PATENTS

| | | | |
|---|---|---|---|
| 2,743,827 | 5/1956 | Winokue | 186—1.1 |
| 3,115,975 | 12/1963 | Thompson | 186—1.1 |
| 3,196,984 | 7/1965 | Stout | 186—1.1 |

FOREIGN PATENTS 903,653  4/1944  France.

EVON C. BLUNK, *Primary Examiner.*

H. C. HORNSBY, *Assistant Examiner.*